United States Patent
Burke et al.

[11] Patent Number: 5,762,101
[45] Date of Patent: Jun. 9, 1998

[54] PRESSURE REGULATING VALVE

[75] Inventors: David Howard Burke, Flint, Mich.;
Grover Wesley Preston, Livonia, N.Y.;
Philip Moore Anderson, Davison, Mich.

[73] Assignee: General Motors Corporation, Detroit, Mich.

[21] Appl. No.: 650,690

[22] Filed: May 20, 1996

[51] Int. Cl.$^6$ ............................................. F16K 17/196
[52] U.S. Cl. ............................................. 137/469
[58] Field of Search ........................ 137/469, 543.23, 137/543.21

[56] References Cited

U.S. PATENT DOCUMENTS

| | | |
|---|---|---|
| 2,005,931 | 6/1935 | Buttner . |
| 2,254,209 | 9/1941 | Buttner et al. . |
| 2,447,729 | 8/1948 | Bertea ................................ 137/543.23 |
| 2,622,613 | 12/1952 | McNeal ................................ 137/469 |
| 2,666,448 | 1/1954 | Garretson et al. . |
| 2,683,464 | 7/1954 | St. Clair . |
| 2,781,778 | 2/1957 | Lisciani . |
| 2,868,460 | 1/1959 | Hansen et al. . |
| 3,145,732 | 8/1964 | Joles . |
| 3,782,412 | 1/1974 | Darash . |
| 3,872,875 | 3/1975 | Raidl ................................ 137/469 |
| 4,140,148 | 2/1979 | Richter . |
| 4,350,176 | 9/1982 | Lace . |
| 4,505,298 | 3/1985 | Rasmussen . |
| 4,726,395 | 2/1988 | Howes ................................ 137/469 |
| 5,203,372 | 4/1993 | Freiler ................................ 137/469 |

FOREIGN PATENT DOCUMENTS 103383   1/1917   United Kingdom ................... 137/469

*Primary Examiner*—Marguerite McMahon
*Attorney, Agent, or Firm*—Saul Schwartz

[57] ABSTRACT

A pressure regulating valve including a valve seat on valve body, a valve element having a flow directing surface, and a spring biasing the valve element toward a closed position in which the flow directing surface bears against and defines a fluid seal at the valve seat. The valve element has a range of open positions in which the flow directing surface and the valve seat are progressively further separated and in which they cooperate in defining an annular flow orifice the area of which varies with the span between the valve seat and the flow directing surface. The flow directing surface redirects fluid flow upstream of the annular flow orifice through about 150° to 180° to induce on the valve element a force reaction which cooperates with a fluid pressure force reaction on the valve element to improve the sensitivity of the valve element to changes in fluid pressure upstream of the annular flow orifice. A skirt of the flow directing surface downstream of the annular flow orifice directs fluid flow substantially parallel to the direction of movement of the valve element to minimize the sensitivity of the valve element to a velocity induced pressure gradient across the valve element.

2 Claims, 3 Drawing Sheets

PRESSURE REGULATING VALVE

FIELD OF THE INVENTION

This invention relates to fluid pressure regulating valves.

BACKGROUND OF THE INVENTION

Common motor vehicle fuel injection systems include a high pressure fuel rail on a motor at the front of the vehicle, a fuel pump in a fuel tank at the back of the vehicle, a high pressure conduit from the pump to the fuel rail, and a diaphragm actuated differential pressure regulating valve at the fuel rail which regulates a constant difference between fuel rail pressure and an intake manifold pressure of the motor by spilling a fraction of pump discharge back to the fuel tank through a low pressure return conduit. So-called single line forward fuel injection systems eliminate the return conduit by providing a pressure regulating valve at an upstream end of the high pressure conduit which regulates a constant pressure in the fuel rail by spilling a fraction of pump discharge directly back into the fuel tank. The aforesaid diaphragm-type pressure regulating valves, while used in some single line forward fuel systems, are objectionably large in size and relatively expensive to manufacture. Simple ball-on-seat type pressure relief valves are smaller and less expensive but are not sufficiently sensitive to changes in the fuel consumption rate of the motor for application as pressure regulating valves in single line forward motor vehicle fuel injection systems.

SUMMARY OF THE INVENTION

This invention is a new and improved pressure regulating valve including a valve seat on a valve body, a valve element having a flow directing surface, and a spring biasing the valve element toward a closed position in which the flow directing surface bears against and defines a fluid seal at the valve seat. The valve element has a range of open positions in which the flow directing surface and the valve seat are progressively further separated and in which they cooperate in defining an annular flow orifice, the area of which varies with the span between the valve seat and the flow directing surface. The flow directing surface redirects fluid flow upstream of the annular flow orifice through about 150°–180° to induce on the valve element a force reaction which cooperates with a fluid pressure force reaction on the valve element to improve the sensitivity of the valve element to changes in fluid pressure upstream of the annular flow orifice attributable to changes in the rate of fuel consumption by the motor. A skirt of the flow directing surface downstream of the annular flow orifice directs fluid flow substantially parallel to the direction of movement of the valve element to minimize the sensitivity of the valve element to a velocity-induced pressure gradient across the valve element. In a preferred embodiment, the flow directing surface is a concave hemispherical surface.

DESCRIPTION OF A PREFERRED EMBODIMENT

Figure 1:
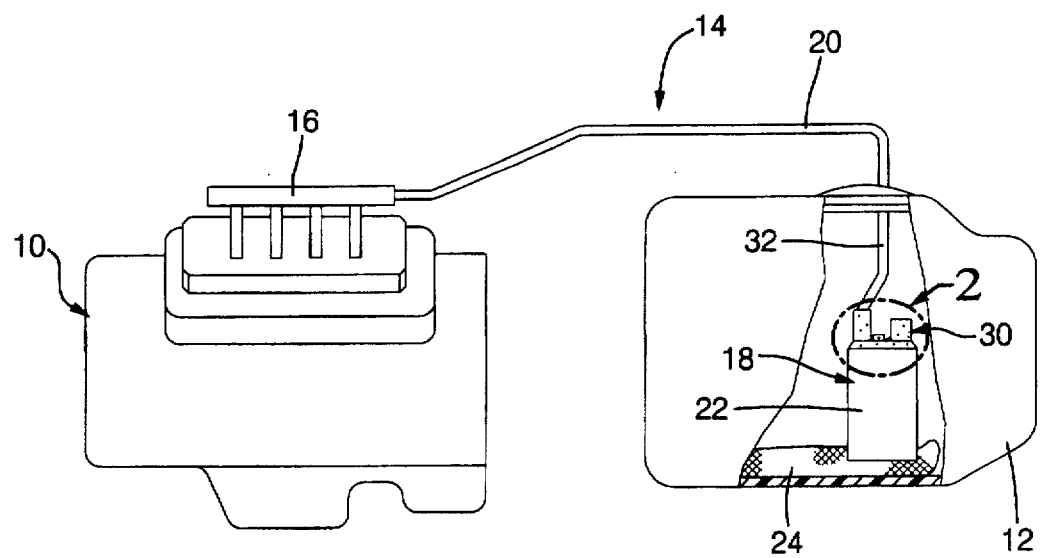
FIG. 1 is a schematic, partially broken-away view of a single line forward fuel injection system of a motor vehicle having a pressure regulating valve according to this invention.
Figure 2:
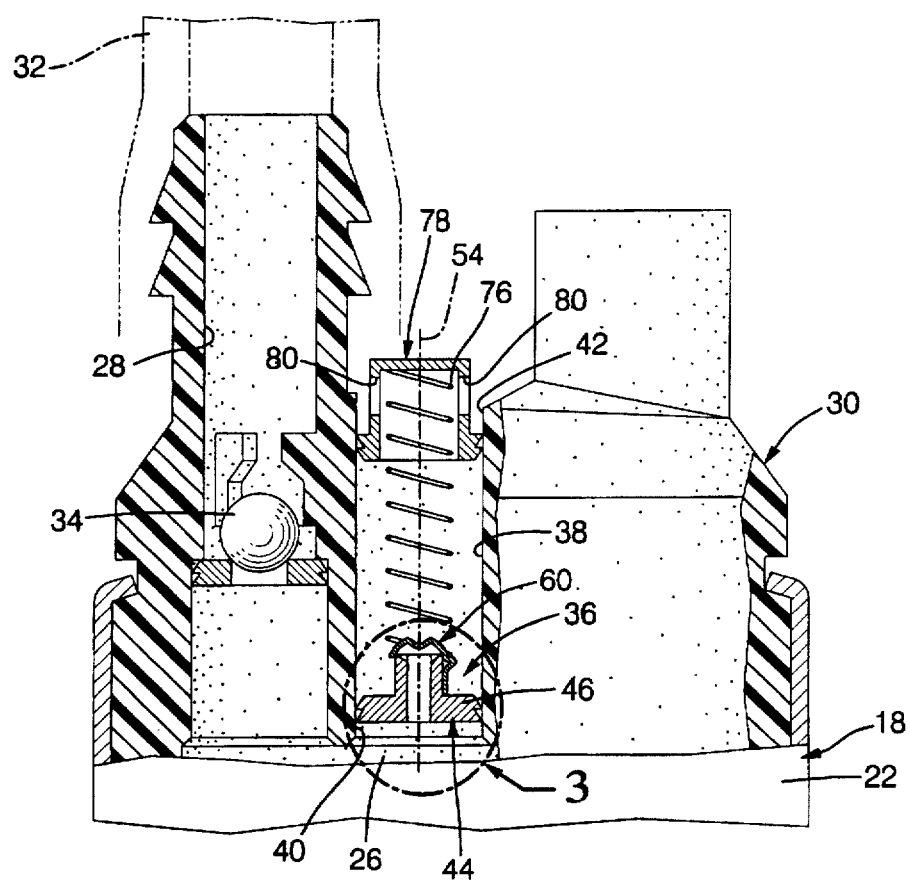
FIG. 2 is a partially broken-away, enlarged view of the portion of FIG. 1 in reference circle 2.

Referring to FIGS. 1–2, a motor vehicle, not shown, has a motor 10 at the front of the vehicle, a fuel tank 12 at the back of the vehicle, and a schematically represented single line forward fuel injection system 14. The fuel injection system 14 includes a fuel rail 16 on the motor connected to individual fuel injectors of the motor, a fuel pump 18 suspended in the fuel tank, and a high pressure conduit 20 for conducting fuel from the fuel pump to the fuel rail.

A tubular housing 22 of the fuel pump 18 surrounds a high pressure pump (not shown) such as a turbine pump or a gerotor pump, and an electric motor (not shown) for driving a rotating element of the high pressure pump. The high pressure pump is supplied with fuel from the fuel tank 12 through an inlet screen 24 and discharges fuel into an interior volume 26, FIG. 2, of the tubular housing 22 around the electric motor. From the interior volume 26 of the tubular housing 22, the discharge of the high pressure pump flows to the high pressure conduit 20 through a discharge passage 28 in an end housing 30 of the fuel pump 18 and a conduit 32 in the fuel tank. A check valve 34 in the discharge passage 28 prevents back flow from the high pressure conduit 20 into the interior volume 26 of the tubular housing 22.

When the electric motor of the fuel pump is on, the high pressure pump discharges fuel into the interior volume 26 of the tubular housing 22 at a substantially constant flow rate which exceeds the maximum consumption rate of the motor 10. A pressure regulating valve 36 according to this invention on the end housing 30 regulates a substantially constant pressure in the interior volume 26 of the tubular housing 22 and in the high pressure conduit 20 and the fuel rail 16 by spilling directly back into the fuel tank a varying fraction of the discharge of the positive displacement pump.

Referring to FIGS. 2–5, the end housing 30 of the fuel pump constitutes a valve housing of the pressure regulating valve 36 including a cylindrical bore 38 which communicates at an inboard end 40 with the interior volume 26 of the tubular housing 22 and at an outboard end 42 with the fuel tank 12. The cylindrical bore 38 is illustrated out of true position on the end housing 30 and the latter may include other elements of the fuel pump, e.g., a bearing for an armature shaft of the electric motor. Also, the valve housing of the pressure regulating valve 36 may be completely separate from the end housing 30.

A valve insert 44 of the pressure regulating valve 36 has a base 46 interference fitted in and sealed against the cylindrical bore 38 at its first end 40. A passage 48 in a tubular stem 50 of the insert 44 integral with the base 46 communicates with the interior volume 26 of the tubular housing 22 and terminates at an internally chamfered, annular end 52 of the stem. An outer wall 56 of the tubular stem 50 is a right circular cylinder which intersects the beveled annular end 52 at a circular edge defining a valve seat 58 (FIG. 3) of the pressure regulating valve 36 in a plane perpendicular to a centerline 54 of the tubular stem.

A valve element 60 of the pressure regulating valve 36 includes a concave, hemispheric flow directing surface 62 interrupted by dimple 64 at the pole of the hemisphere. The valve element is supported on the stem 50 of the valve insert 44 for linear translation in the direction of the centerline 54 of the valve stem by a plurality of flat legs 66 which bear tangentially against the outer wall 56 of the stem. Each of the flat legs 66 merges with the concave flow directing surface 62 at a flat 68 (FIG. 5) and has a fold 70 which defines a platform 72 in a common plane perpendicular to the centerline 54 of the stem.

Figure 3:
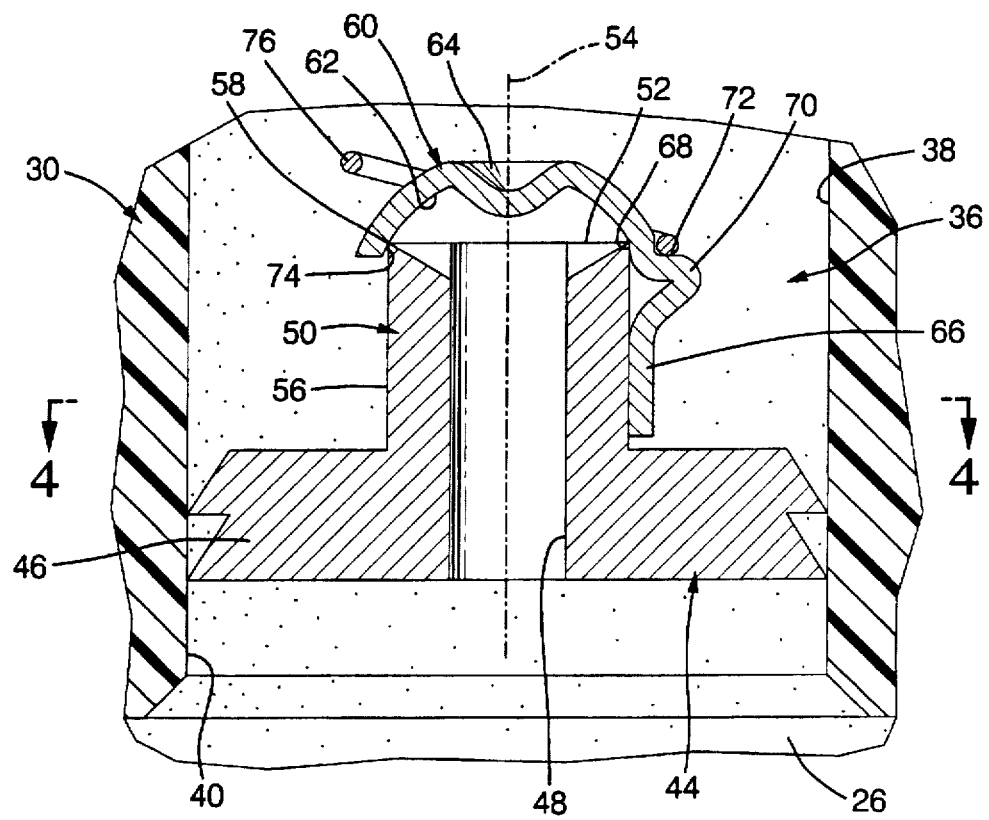
FIG. 3 is an enlarged view of the portion of FIG. 2 in reference circle 3.
Figure 4:
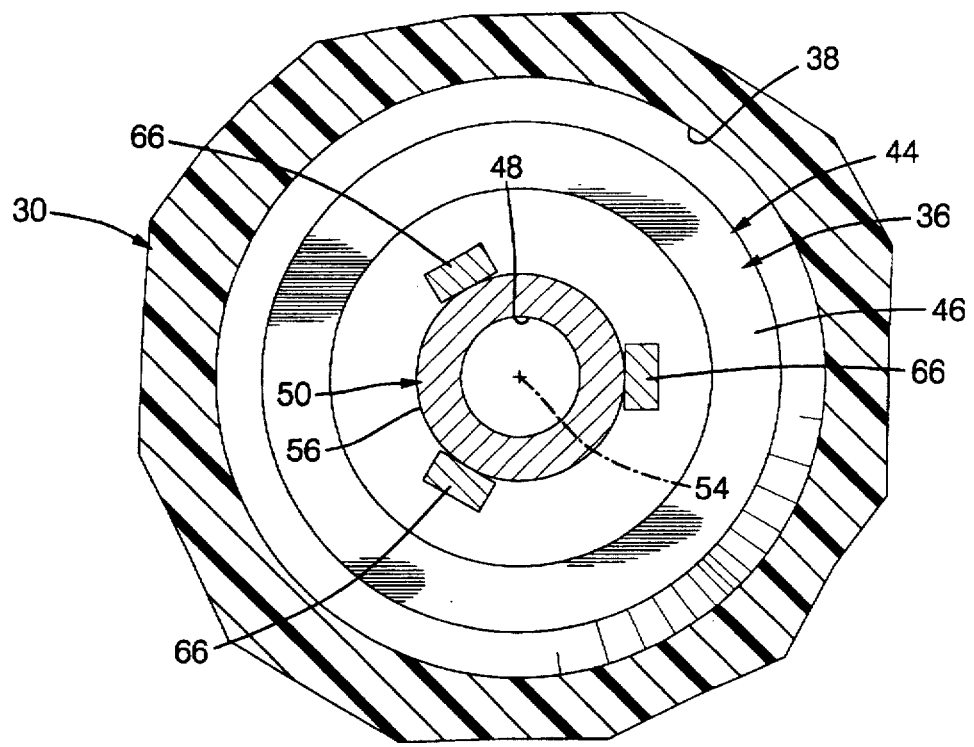
FIG. 4 is a sectional view taken generally along the plane indicated by lines 4–4 in FIG. 3.
Figure 5:
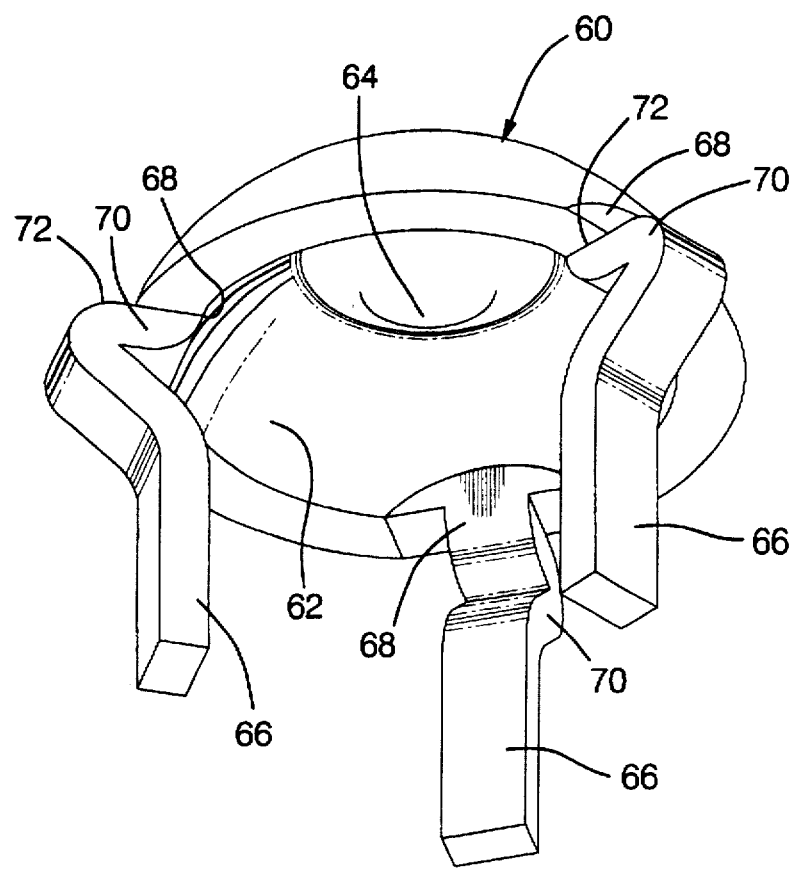
FIG. 5 is a perspective view of a valve element of a pressure regulating valve according to this invention.

The valve element 60 has a closed position, FIGS. 2–3, in which the flow directing surface 62 bears against the valve seat 58 above the flats 68 and blocks fluid flow through the passage 48. In the closed position of the valve element 60, the flow directing surface 62 overlaps the valve seat 58 and the plane of the beveled annular end 52 of the stem in the direction of the centerline 54 to define a skirt 74 radially outboard of the valve seat.

The valve element 60 has a range of open positions, not shown, characterized by progressively more distant separation of the flow directing surface 62 from the valve seat 58 in which the flow directing surface and the valve seat cooperate in defining therebetween an annular flow orifice through which the passage 48 communicates with the bore 38. Throughout the range of open positions of the valve element 60, the skirt 74 of the flow directing surface 62 overlaps the plane of the annular end 52 of the stem 50 in the direction of the centerline 54. In a proposed single line forward fuel system, the span of the aforesaid range of open positions of the valve element is about 0.01 inch.

A coil spring 76 in the bore 38 in the end housing 30 seats at one end on the platforms 72 on the legs 66 of the valve element and at the other end against a cup-shaped retainer 78 which is interference fitted in the bore 38 at its outboard end 42. The spring 76 biases the valve element 60 toward its closed position. The retainer 78 is perforated at 80 to afford flow communication between the bore 38 and the fuel tank 12. The retainer 78 and the bore 38 may have screw threads to permit adjustment of the position of the retainer in the direction of the centerline 54 of the valve element.

When the electric motor of the fuel pump 18 is off, the spring 76 seats the flow directing surface 62 of the valve element 60 against the valve seat 58 to block fluid flow from the passage 48 in the valve insert 44 into the bore 38. The fuel rail 16 and high pressure conduit 20 are filled with fuel trapped by the check valve 34.

When the electric motor of the fuel pump 18 is on, the pressure regulating valve 36 regulates a substantially constant fluid pressure in the interior volume 26 of the tubular housing 22, in the high pressure conduit 20 and in the fuel rail 16 by spilling directly back into the fuel tank 12 a fraction of the substantially constant discharge of the high pressure pump of the fuel pump. The fraction spilled back into the fuel tank is inversely proportional to the fraction consumed by the motor 10.

More particularly, when the electric motor is turned on, rapidly increasing fluid pressure in the interior volume 26 reacts against the flow directing surface 62 of the valve element 60. When the net fluid pressure force on the valve element 60 exceeds the force exerted by the spring 76 on the valve element, the valve element translates linearly in the direction of the centerline 54 to an open position. The fluid pressure gradient across the corresponding annular flow orifice induces a spill flow through the latter from the interior volume 26 and the passage 48 into the bore 38 and the fuel tank 12.

Upstream of the annular flow orifice, the spill flow it is redirected by the flow directing surface 62 through about 150° to 180° and induces on the valve element a corresponding force reaction attributable to the change in direction of the spill flow. The valve element 60 stabilizes in an open position within its range of open positions when static equilibrium is achieved between the force of spring 76 on the valve element and the sum of the fluid pressure and directional change reactions on the valve element. In that circumstance, the rate of spill flow through the annular orifice maintains the fluid pressure in the interior volume 26 at a predetermined, regulated magnitude. The dimple 64 induces centering forces on the valve element which minimize friction between the valve element and the tubular stem 50.

The valve element 60 maintains the regulated pressure in the interior volume 26 by increasing and decreasing the size of the annular flow orifice as the fraction of the discharge of the positive displacement pump consumed by the motor 10 changes. When the fraction consumed by the motor decreases, instantaneous fluid pressure in the interior volume increases and disturbs the aforesaid static equilibrium so that the valve element translates linearly to an open position having a larger corresponding annular flow orifice. Conversely, when the fraction consumed by the motor increases, instantaneous fluid pressure in the interior volume decreases and disturbs the aforesaid static equilibrium so that the valve elements translates linearly to an open position having a smaller corresponding annular flow orifice.

The aforesaid force reaction on the valve element 60 attributable to the change in direction of the spill flow improves the response of the valve element to changes in the motor-consumed fraction of the discharge of the high pressure pump. For example, when the motor-consumed fraction decreases and the instantaneous fluid pressure force reaction increases, linear translation of the valve element 60 increases the flow area of the annular orifice. Concurrently, the spill flow rate and corresponding direction change force reaction on the valve element 60 also increase, thereby contributing to more rapid translation of the valve element to the new open position.

Conversely, when the motor-consumed fraction of the discharge of the high pressure pump increases and the instantaneous fluid pressure force reaction decreases, linear translation of the valve element 60 decreases the flow area of the annular orifice. Concurrently, the spill flow rate and corresponding direction change force reaction on the valve element 60 also decrease, thereby contributing to more rapid translation of the valve element to the new open position by the spring 76.

The valve element 60 is further exposed to a pressure gradient attributable to the velocity of the spill flow immediately downstream of the annular orifice between the valve seat 58 and the flow directing surface 62. Such flow velocity induces a zone of low pressure relative to the pressure in the bore 38 surrounding the valve element which biases the valve element toward the low pressure side of the gradient. If such pressure gradient has a substantial component parallel to the direction of linear translation of the valve element 60, the sensitivity of the valve element to changes in the fuel consumption rate of the motor 10 may be compromised.

Importantly, however, the skirt 74 of the flow directing surface 62 of the valve element 60 overlaps the plane of the beveled annular end 52 of the valve stem 50 and the valve seat 58 in the direction of the centerline 54 throughout the range of open positions of the valve element. The skirt 74 functions to direct spill flow substantially parallel to the direction of linear translation of the valve element, i.e., substantially parallel to the centerline 54, so that the flow velocity induced pressure gradient is perpendicular to the centerline 54 and without any substantial component parallel to the direction of linear translation of the valve element 60. Further, since the flow velocity induced pressure gradient acts around the full circumference of the valve seat 58, the forces attributable to that gradient are all directed through the centerline 54 and do not tilt the valve element 60 on the tubular stem 50.

What is claimed is:

1. A pressure regulating valve comprising:

a valve body having a bore between a source of fluid under pressure and a low pressure fluid tank, a valve insert means having a base sealed in said bore and a tubular stem in said bore terminating at an annular end in a plane perpendicular to a passage in said tubular stem, said passage in said tubular stem being open at opposite ends to said source of fluid under pressure and to said low pressure fluid tank, a right circular cylindrical outer wall on said tubular stem intersecting said annular end at a circular valve seat, a valve element having a hemispheric concave flow directing surface and a dimple at a pole of said hemispheric concave flow directing surface, means operative to mount said valve element on said valve insert means for linear translation relative to said valve seat in the direction of a centerline of said passage in said tubular stem between a closed position in which in said concave flow directing surface engages said valve seat and blocks flow through said passage in said tubular stem and a range of open positions in which said concave flow direction surface is progressively further separated from said valve seat and cooperates therewith in defining an annular flow orifice for fluid flow from said passage in said tubular stem into said low pressure fluid tank, a skirt on said concave flow directing surface overlapping said plane of said circular valve seat in the direction of said centerline of said passage in said tubular stem throughout said range of open positions of said valve element operative to direct fluid flow from said annular orifice substantially parallel to said centerline of said passage in said tubular stem; and a spring biasing said valve element toward said closed position.

2. The pressure regulating valve recited in claim 1 wherein said means operative to mount said valve element on said valve insert means for linear translation relative to said valve seat in the direction of said centerline of said passage in said tubular stem comprises:

a plurality of flat legs on said valve element parallel to said centerline of said passage in said tubular stem each bearing slidably and tangentially against said right circular cylindrical outer wall said tubular stem.

* * * * *